Aug. 7, 1962　　　　　E. R. ALLER　　　　　3,048,450
HOPPER CAR FOR GRANULAR MATERIALS
Filed June 22, 1959　　　　　　　　　　　　　　5 Sheets-Sheet 1
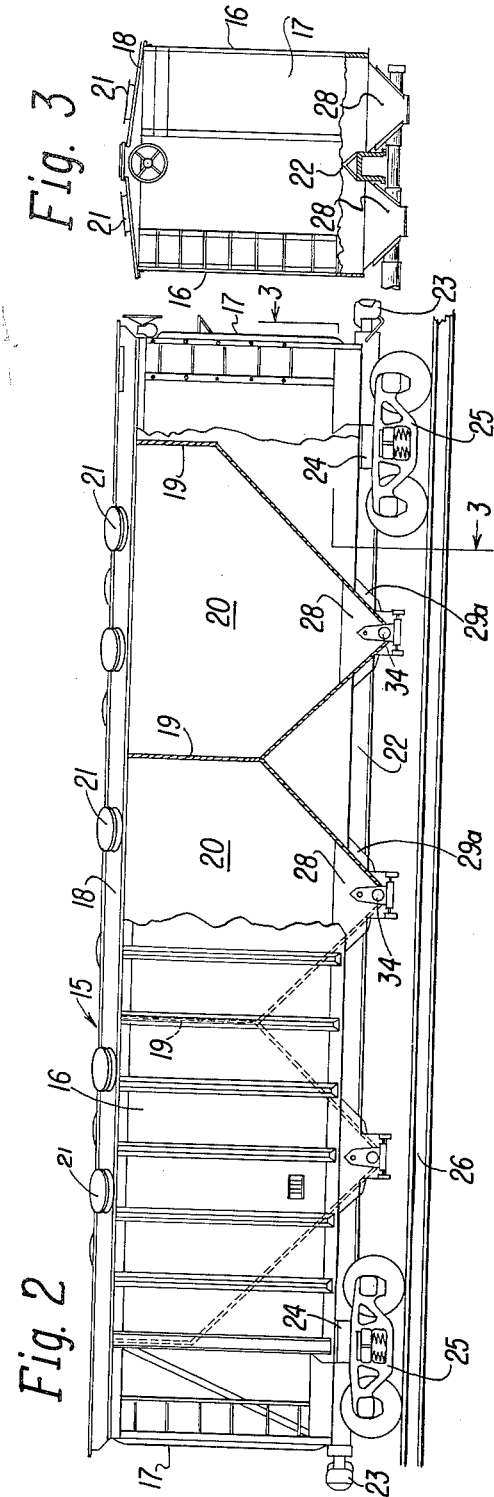
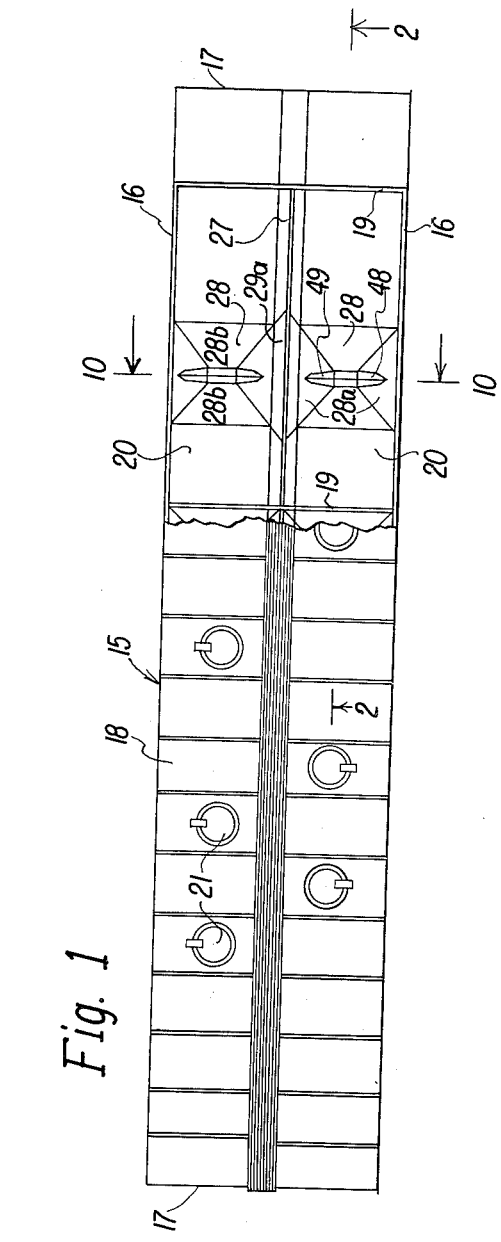
INVENTOR.
EDMUND R. ALLER
BY
Prangley, Baird, Clayton, Miller & Vogel,
ATTYS.

Aug. 7, 1962 E. R. ALLER 3,048,450
HOPPER CAR FOR GRANULAR MATERIALS
Filed June 22, 1959 5 Sheets-Sheet 2

INVENTOR.
EDMUND R ALLER
BY
Pranglay, Baird, Clayton, Miller
& Vogel, ATTYS.

INVENTOR.
EDMUND R ALLER
BY
Pringley, Baird Clayton Miller
& Vogel, ATTYS.

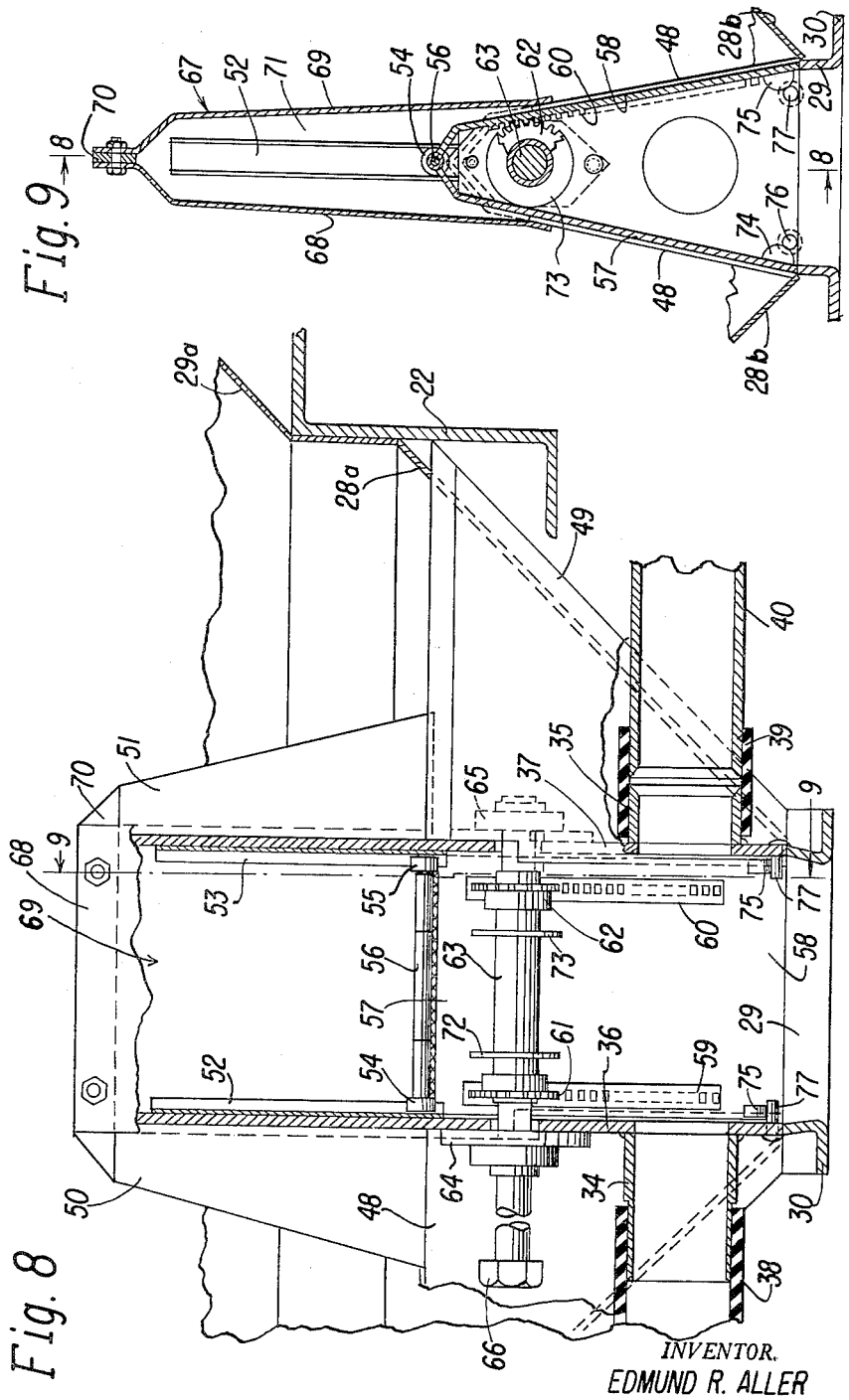

Aug. 7, 1962
E. R. ALLER
3,048,450
HOPPER CAR FOR GRANULAR MATERIALS
Filed June 22, 1959
5 Sheets-Sheet 5
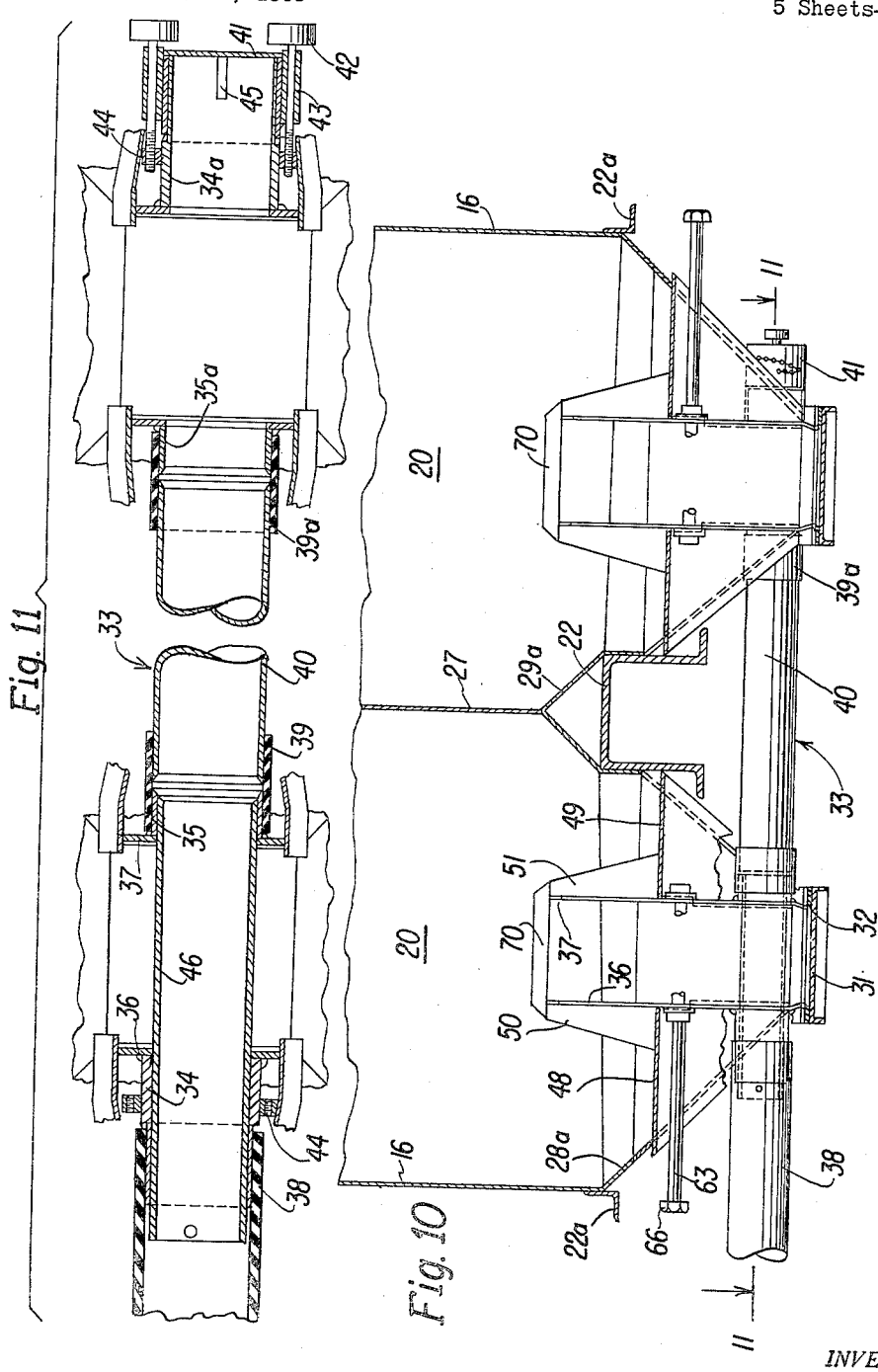
INVENTOR.
EDMUND R. ALLER
BY
ATTYS.

United States Patent Office 3,048,450
Patented Aug. 7, 1962

3,048,450
HOPPER CAR FOR GRANULAR MATERIALS
Edmund R. Aller, Gary, Ind., assignor to General American Transportation Corporation, Chicago, Ill., a corporation of New York
Filed June 22, 1959, Ser. No. 822,093
26 Claims. (Cl. 302—52)

This invention relates to hoppers for free-flowing granular materials, and more particularly to hoppers incorporating combination pneumatic and gravity outlets for unloading such materials from the hoppers. The invention has utility in connection with stationary storage hoppers or bins, but is especially applicable to transportable hoppers such as those provided with a railway car body and commonly referred to in the railroad industry as hopper cars.

In the shipment by vehicle of certain free-flowing granular materials (grains, malt, sand, gravel, cinders, bead-like substances, etc.) it is customary to employ vehicle bodies that are constructed to define a number of individual hoppers which respectively contain corresponding portions of the granular lading, and each of the hoppers is provided with a bottom outlet that accommodates discharge of the lading therefrom. Certain such materials, such as malt, are susceptible to being unloaded from the hopper via the bottom outlet thereof either by pneumatic action or by gravity action, and the particular mode of unloading used is determined by the unloading installation, certain of which employ pneumatic unloading equipment while others employ gravity unloading equipment. In the past, this situation has made it necessary for the carrier to provide either of two types of hopper cars, one that can be unloaded by gravity or one that can be unloaded pneumatically as necessitated by the unloading facility available, and this imposes on both the shipper and the carrier the necessity of correlating the type of hopper car to be employed for the lading with the type of unloading facility that is employed by the consignee. This, of course, has resulted in confusion, delay and added expense in connection with such shipments.

As a consequence, efforts have been made to combine in a single hopper car structure an unloading or outlet assembly which can be used with either pneumatic or gravity unloading equipment, and an example of a hopper for free-flowing granular materials wherein such combinative unloading assembly is provided is disclosed in the copending application of Edmund R. Aller, Serial No. 623,060, filed November 19, 1956, now Patent No. 2,919,-158. While the unloading assembly disclosed in this Aller application is quite suitable for use with many materials, the present invention constitutes an improvement thereover and is especially suited for use with free-flowing granular materials which comprise hard, unyielding particles such as malt, for which the system disclosed in the prior application is not particularly suited.

Accordingly, it is a general object of the present invention to provide a hopper adapted to contain granular materials, and which incorporates an improved combination pneumatic and gravity unloading system for controlling the discharge of the materials from the hopper.

Another object of the invention is that of providing in a hopper for granular materials composite structure at the bottom of the hopper that may be selectively controlled to serve either as a pneumatic unloading tube for the material or as a bottom gravity outlet for the material, and in which valve structure is incorporated for controlling the flow of material from the hopper to both the pneumatic unloading tube and the bottom gravity outlet.

Still another object is in the provision of a hopper, for granular materials, having a valve that controls the flow of such materials to both the pneumatic and gravity unloading assembly, and in which the valve requires no displacement of the lading in being moved from its fully closed toward its fully open position and, in fact, tends to recede slightly from the lading during movement toward such fully open position.

Yet another object of the invention is to provide a hopper having a combination pneumatic and gravity unloading assembly and valve structure to control the movement of the granular materials to the unloading assembly, and in which the movement of the valve is positive and forceful so that it can be opened irrespective of the solidity of the lading and can also be closed before the lading is completely unloaded from the hopper.

A further object of the invention is that of providing a hopper, valve, and pneumatic and gravity unloading combination of the type described, and in which the valve and mechanism therefor are disposed wholly within the hopper and, thus, are not exposed to the weather but at the same time are readily accessible for cleaning so as to afford the sanitary conditions requisite for food materials.

Still a further object is in the provision of a hopper car having a body that defines a plurality of individual hoppers therein, each hopper incorporating the improved valve-controlled combination pneumatic and gravity unloading assembly.

Yet a further object is to provide an improved combination pneumatic and gravity unloading device for a hopper adapted to contain granular materials, and wherein the device is of simple construction and arrangement lending the same to ready and economical use in railway hopper cars.

The invention, both as to its organization and method of operation, together with further objects and advantages thereof, will best be understood by reference to the following specification taken in connection with the accompanying drawings, in which:

FIGURE 1 is a top plan view of a vehicle body that is constructed to define a plurality of hoppers each adapted to contain granulated materials, and in which a portion of the body is broken away to show the interior of an adjacent pair of hoppers;

FIGURE 2 is a longitudinal sectional view of the vehicle illustrated in FIGURE 1, and is taken along the line 2—2 of FIGURE 1;

FIGURE 3 is a vertical sectional view taken along the line 3—3 of FIGURE 2;

FIGURE 8 is an enlarged, broken vertical sectional view of the valve structure and combination pneumatic and gravity unloading assembly, and is taken along the lines 8—8 of FIGURE 9;

FIGURE 9 is a vertical sectional view taken along the line 9—9 of FIGURE 8;

FIGURE 10 is a transverse vertical sectional view taken along the line 10—10 of FIGURE 1; and FIGURE 11 is an enlarged, transverse horizontal sectional view taken along the line 11—11 of FIGURE 10.

Figure 6:
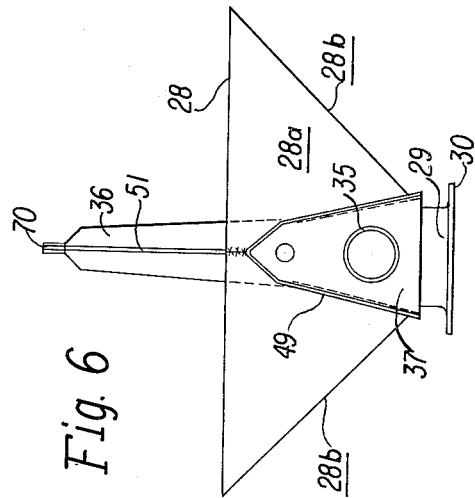
FIGURE 6 is an end view in elevation of the structure shown in FIGURES 4 and 5.

Referring now to FIGURES 1 through 3, there is illustrated a vehicle body 15 in the form of a railway car body or the like, defining a plurality of hoppers embodying the features of the present invention. In the specific illustration, six such hoppers are included, and they are arranged in two longitudinal rows of three hoppers each, and the hoppers are also arranged in transversely aligned pairs as shown in FIGURES 1 and 3. More particularly, the vehicle body 15 comprises the usual elongated, upstanding, longitudinally extending side walls 16, end walls 17, top walls 18, and particular bottom wall structure described more fully hereinafter. The vehicle body 15 is also equipped with four longitudinally spaced, laterally extending divider walls 19 arranged so as to define the three adjacent and generally similar hoppers 20 in each of the longitudinal rows thereof. Further, the body 15 comprises the usual longitudinally extending center sill 22 arranged adjacent the lower central portion thereof, and the center sill is equipped at the respective ends thereof with couplers 23 and bolsters 24, the latter of which are respectively carried by wheel-equipped trucks 25 adapted to be rollingly supported upon the rails 26 of a railway track. The usual side sills 22a parallel the center sill and define the longitudinal edges of the body, and extending upwardly above the center sill 22 is an elongated, longitudinally extending partition 27 which divides the vehicle body into the two longitudinal rows of three hoppers each. The hoppers 20 are each adapted to contain granular material, such as malt, and the top wall 18 of the vehicle body is provided with a plurality of hatch structures 21 that accommodate loading of the material into the respective hoppers 20.

Figure 4:
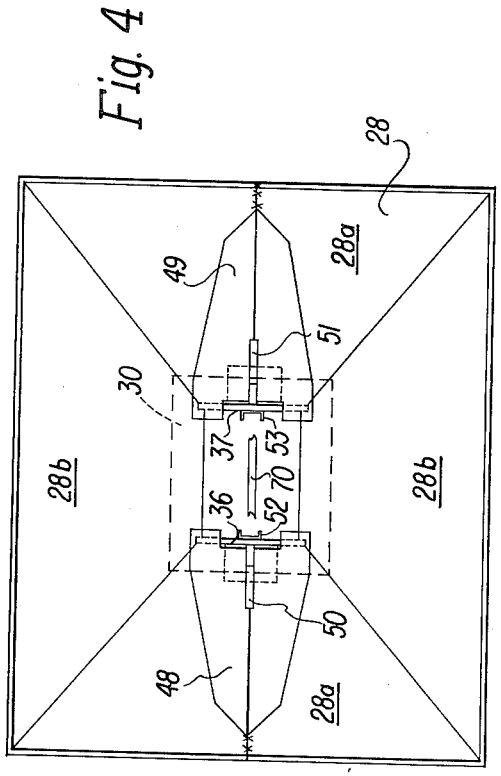
FIGURE 4 is an enlarged top plan view of the bottom wall of one of the hoppers removed from the vehicle body and with the valve and actuating mechanism therefor omitted.
Figure 5:
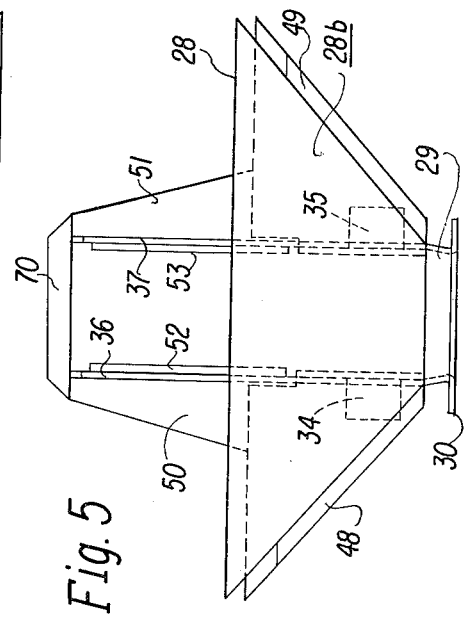
FIGURE 5 is a side view in elevation of the structure shown in FIGURE 4.
Figure 7:
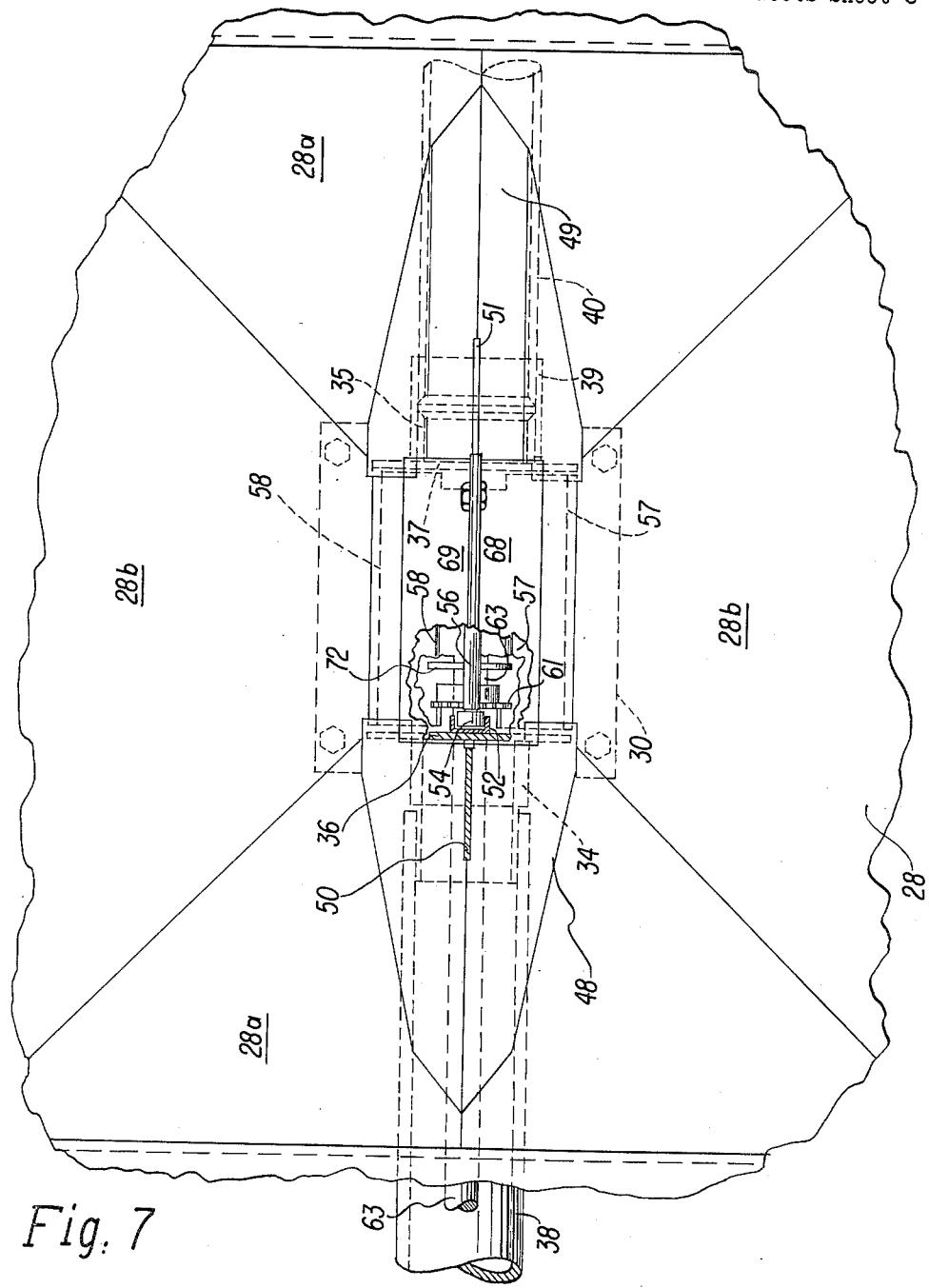
FIGURE 7 is a greatly enlarged, broken top plan view of the structure shown in FIGURE 4, and corresponds thereto except that the valve and actuating mechanism therefor are included.

The longitudinal side walls of the hoppers 20 are comprised by the respective side walls 16 of the vehicle body 15 and by the longitudinal partition 27 therein, all of which are vertically disposed in substantial parallel alignment as is seen most clearly in FIGURE 10. The end walls of the hoppers 20 are vertically disposed throughout the portions thereof defined by the respective transverse partitions 19, and incline downwardly from these transverse portions toward the lower end of the hopper or bottom wall of the car body, as is best illustrated in FIGURE 2. Each of the two center hoppers 20 is geometrically symmetrical about a transversely oriented center plane therethrough, but the respective end hoppers are not so symmetrical in that the slope length of the outer inclined wall portions thereof is substantially greater than the slope length of the inner inclined wall portions thereof. However, such difference between the respective end and center hoppers is a design matter related to the body length, hopper dimensions and number of hoppers defined in the car body and is not germaine to the present invention. In any event, the side walls and inclined end walls of each hopper 20 terminate in a bottom wall structure 28, considered in detail in FIGURES 4 to 6, which includes the apparatus embodying the invention.

Referring now to these three figures in particular, it is seen that each bottom wall structure 28 comprises four individual wall panels including a pair of side wall panels 28a and a pair of end wall panels 28b. The wall panels 28a and 28b are substantially identical, each having the general configuration of a trapezoid so that the bottom wall structure 28 has the general form of an inverted truncated pyramid. In this arrangement, the center sill 22 is interposed between the two longitudinal rows of hoppers 20, as shown most clearly in FIGURES 3 and 10, although the respective upper edge portions of the center sill tend to project slightly into the adjacent hoppers. Those portions of the center sill that would otherwise be exposed to the interiors of the respective hoppers are each covered by one of the tapered shields 29a, each of which extends longitudinally of the center sill through the associated hopper.

The bottom wall 28 of each of the hoppers 20 terminates in a bottom gravity discharge opening that is surrounded by a rectangular, downwardly projecting collar 29 provided with an outwardly directed flange 30 to which there is detachably secured a closure member or cover 31, as seen in FIGURE 10. The cover 31 is removably retained in place by suitable structure (not shown), and is sealingly related to the flange 30 through a gasket 32 arranged therebetween, the gasket 32 being formed of sheet rubber or like material. The cover 31 is removed when it is desired to unload the associated hopper by gravity action.

Further considering FIGURE 10, and FIGURES 8 and 11 therewith, it is seen that the bottom wall structure 28 is equipped also with a pneumatic unloading device indicated generally by the reference numeral 33, which comprises a pair of outer and inner laterally extending and aligned tubes 34 and 35 respectively projecting through the bottom panels 28a. The inner ends of the tubes 34 and 35 are disposed within the bottom of the associated hopper 20 in axially aligned, transversely spaced-apart relation, and such inner ends thereof are respectively secured by welding, as shown in FIGURE 8, to transversely spaced cheek plates 36 and 37 which are respectively provided with an opening therethrough communicating with the associated tube. The cheek plates 36 and 37 are vertically oriented and extend upwardly into the hopper from the bottom gravity opening thereof and are integral with the collar 29. The tube 34 is adapted to be connected at its outer end to a suction conduit 38 comprising a component of a pneumatic unloading facility; and the tube 35 is normally connected at its outer end by a coupling 39 to one end of a connector tube 40. The connector tube 40 at its other end is connected by a coupling 39a to a tube 35a which corresponds in function to the tube 35, and is connected with the interior of a hopper 20 associated therewith and which is adjacent the hopper arranged with the tubes 34 and 35. Such adjacent hopper is also connected with a tube 34a that corresponds to the tube 34 and is also adapted to be connected selectively to the suction conduit 38. However, as shown in FIGURES 10 and 11, the tube 34a is equipped with a closure cap 41 that telescopes thereover and is adjustably secured in position thereon by fasteners exemplified herein by head-equipped bolts 42 having shanks that rotatably and slidably pass through respective lugs 43 carried by the cap and which threadedly engage respective nuts 44 carried by the tube 34a. The cap 41 has one or more longitudinally extending slots 45 formed in the side wall thereof which is adapted to pass air therethrough, and thus when the cap is moved longitudinally toward the right as viewed in FIGURE 11, the interior of the tube 34a communicates through each such slot 45 with atmosphere so that secondary air can be drawn into the tubes 34a, 35a, 40, 35 and 34 to facilitate pneumatic unloading of one or both of the transversely paired hoppers 20.

Thus, it is apparent that the tube composition described comprises the pneumatic unloading device and that the tube arrangement for each hopper is identical. In view of this identity of structure, and because the entire tube composition must be closed off during storage and transit, the tube 34 is also equipped with nuts 44 adapted to respectively receive the bolts 42 of an identical cap 41. Such identical cap will also permit secondary air to be metered into the tube 34 whenever it is more convenient to connect the suction line 38 to the tube 34a. The amount of secondary air admitted to either the tube 34 or 34a will depend upon the position of the cap 41 thereon, and more particularly the extent or length of the slots 45 which are uncovered by outward movement of the cap along the tube associated therewith.

It will be noted in FIGURE 11 that each pair of transversely aligned hoppers 20 can be isolated pneumatically one from the other by inserting a blanking tube 46 into the tubes 34 and 35, for such blanking tube effectively by-passes the hopper 20 associated with the tubes 34 and 35 and thereby directly connects the tube 34 with the connector tube 40 and therefore with the tube 35a and hopper 20 associated therewith. It is evident that the blanking tube 46 may be inserted alternatively into the tubes 34a and 35a to by-pass the hopper 20 associated therewith and thereby directly connect the tube 34a to the tube 35 and, therefore, with the hopper 20 associated therewith whenever this is necessary or desirable. Each pair of transversely aligned hoppers 20 defined by the vehicle body 15 is equipped with a pneumatic unloading assembly comprising the tube composition and interconnection thereof described.

The tubes 34 and 35 (also, the tubes 34a and 35a) are respectively shielded and thereby isolated from the material-receiving interior portion of the associated hopper 20, except through the cheek plates 36 and 37, by the respective end covers 48 and 49 which extend transversely through the bottom end portion of the hopper above the tubes. Each of the covers 48 and 49 is generally triangular in cross section with the apex along the upper edge thereof, and the covers are respectively secured at their inner ends to the cheek plates 36 and 37 and extend outwardly through the inclined bottom wall panels 28a of the hopper, as shown best in FIGURES 4 through 6, and are welded to the panels so as to be rigid therewith and provide a seal about the line of intersection thereof. The end covers 48 and 49 are also respectively connected to the cheek plates 36 and 37 by gussets 50 and 51 which reinforce the upper end portions of the cheek plates and lend rigidity thereto.

The upper end portions of the cheek plates are respectively equipped with generally U-shaped channels 52 and 53 which are vertically oriented and define tracks in which respective guide rollers 54 and 55 ride. The guide rollers are provided at opposite ends of a hinge 56 which extends horizontally between the cheek plates 36 and 37 and is secured to the upper ends of a pair of facing, depending gates 57 and 58 that define a gate valve which controls the discharge of material from the hopper. The gate 58 is equipped along the inner surface thereof adjacent its respective upwardly extending edges with racks 59 and 60 which are respectively engaged by gears 61 and 62 constrained against rotation on a shaft 63 that extends transversely through the cheek plates 36 and 37 and is rotatable with respect thereto. Preferably, the shaft 63 is supported for rotation in bearings 64 and 65 respectively carried by the cheek plates 36 and 37, and the shaft is elongated at the end thereof adjacent the cheek plate 36 and extends outwardly therefrom through the inclined wall panel 28a of the hopper and is equipped at its outer end with a head or nut 66 adapted to be engaged by a crank which is employed to effect rotation of the shaft. It will be evident that when the shaft 63 is rotated in one direction, the gate 58 is moved upwardly because of the meshing engagement of the respective gears 61 and 62 with the racks 59 and 60 therefor; and similarly, reverse rotation of the shaft 63 will cause downward movement of the gate 58. It is equally clear that the gate 57 will be forced to move simultaneously with the gate 58 and in the same directions thereof since the gates are connected to each other through the hinge 56.

When the gate valve is moved from the lower fully closed position thereof shown in FIGURES 8 and 9 and toward its upper fully open position, it is retracted into a hood 67 supported thereabove which is formed by a pair of generally vertical wall members 68 and 69 that are turned inwardly at their upper ends and are removably secured at such ends by nuts and bolts to a strap or hanger 70 extending between and carried by the gussets 50 and 51. The wall members 68 and 69 of the hood diverge slightly as they extend downwardly along the upwardly oriented edges of the cheek plates 36 and 37, and at their lower edges are turned outwardly so as to conform substantially to the angular disposition of the gates 57 and 58. The hood, together with the upper end portions of the cheek plates, defines a compartment 71 into which the gate valve is moved when it is shifted from the closed toward the open position thereof by rotation of the shaft 63; and thus, the valve does not have to be moved bodily against the mass of granular material contained within the hopper. During such movement, the gates 57 and 58 are prevented from being displaced toward each other by the weight bearing thereagainst of the material contained within the hopper by engagement of the gates along the inner surfaces thereof with a pair of wheels 72 and 73 carried in spaced-apart relation by the shaft 63 intermediate the gears 61 and 62. The circumferential surface of the wheels 72 and 73 is smooth, and the gates 57 and 58 ride freely therealong as the valve is moved between the open and closed positions thereof.

By referring to FIGURES 8 and 9, it will be seen that each of the gates 57 and 58 along the bottom end thereof is equipped with a pair of semi-circular bosses or guides defining cams, respectively oriented adjacent the transverse edges of the gate, adapted respectively to engage and ride over a pair of pins rigidly carried by each of the cheek plates. The two cams of the respective gates 57 and 58 are denoted with the numerals 74 and 75 and the corresponding pins with the numerals 76 and 77. Thus, considering FIGURE 8 in particular, it will be apparent that each of the gates is provided with a cam adjacent each of the lower transverse edge portions thereof, and each such cam has a pin engageable therewith. When the gate valve is moved downwardly from its open position and into its fully closed position, the cams 74 and 75 respectively ride onto the pins 76 and 77 corresponding thereto, and thereby urge the lower end portion of each of the gates 57 and 58 outwardly and into firm engagement with the bottom wall panels 28b, with the upper end of the collar 29, and with the overlapping edges of the end covers 48 and 49 through the entire extent of such edges. Thus, the gate valve when closed seals off the interior of the hopper from the bottom outlet structure which comprises the gravity discharge opening defined by the collar and the pneumatic unloading device. However, when the gate valve is moved upwardly from its fully closed and into its open position, the cams are withdrawn from engagement with the pins, and the lower end portions of the gates 57 and 58 tend to recede inwardly toward each other and away from the granular materials pressing thereagainst so that such materials do not interfere with movement of the gate valve.

Furthermore, when the gates 57 and 58 occupy their closed positions, as shown in FIGS. 8 and 9, the engagements between the cams 74 and 75 and the respective pairs of pins 76 and 77 serve to back-up the lower edges of the gates 57 and 58, so as to prevent bending of the lower portions thereof due to the pressure of the lading upon the gates 57 and 58, while the railway car is in transit.

As shown in FIGURES 6 and 9, both of the end covers 48 and 49 and the hood 67 are substantially pointed and have a restricted cross section along the upper edges thereof, so that there is little tendency for the material contained within the hopper to catch thereon or adhere thereto during discharge of such material. Therefore, substantially all of the material is readily removed from the hopper and the necessity of refined cleaning or purging thereof is obviated. Furthermore, the hood 67 is removably carried by the strap 70, and it can be removed therefrom simply by releasing the nuts and bolts that secure the wall members 68 and 69 of the hood to the strap. This is easily done when the hopper is empty, thus exposing the gate valve and associated mechanism for cleaning, repainting, etc. All of the components of the valve assembly, including the mechanism for operating the same, are contained within the interior of the hopper which then maintains the assembly in a sanitary condition. Yet the valve is readily manipulated through the shaft 63 which extends outwardly beyond the hopper.

From the foregoing, it is clear that the gate valve completely isolates the interior of the hopper from both the pneumatic unloading and gravity unloading assemblies when the valve is closed. However, when the valve is open, both the pneumatic and gravity unloading assemblies are in direct communication with the interior of the hopper. If the gravity unloading system is to be employed, the cover 31 will be removed from its sealed position with respect to the flange 30 and when the valve is opened, material within the hopper will then flow freely through the gravity discharge opening defined by the collar 29. If the pneumatic unloading system is used, the cover 31 is left in position and a pneumatic line is connected to either the tube 34 or 34a, depending upon which connection can be made most conveniently. It will be apparent that the cap 41 covering such tube must first be removed before the pneumatic line can be connected thereto, and that the cap carried by the other tube will be released slightly to permit ingress of secondary air to the pneumatic line.

The transversely aligned hoppers 20 can be unloaded selectively or simultaneously, depending upon whether the valve of one or both of the hoppers is opened. In some instances, it may be desirable to unload one of the paired hoppers pneumatically at the same time that the other is being unloaded by gravity, and this can be accomplished by use of the blanking tube 46 which will effectively isolate such gravity unloaded hopper from the pneumatic line.

It is apparent that since the gate valve in being moved into an open position does not displace the lading contained within the hopper, the lading may comprise hard, unyielding materials such as granulated or bead-like plastics. Moreover, the individual gates 57 and 58 which comprise the gate valve are relatively thin elements and move generally along the longitudinal axis thereof when the valve is closed. Therefore, the valve may be closed before the lading is completely unloaded, whether such unloading be by gravity action or pneumatic action, even where the lading comprises a hard, unyielding material for the relatively thin gates tend to knife or cut downwardly through such lading as the valve is moved into its closed position.

Furthermore, it will be understood that the gates 57 and 58 may be selectively moved into intermediate positions with respect to their fully closed positions and their fully open positions, thereby to govern or to meter the rate of flow of the granular material from the hopper body through the bottom outlet structure, when either the gravity unloading system or the pneumatic unloading system is employed in the unloading operation.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a pair of hopper bodies each adapted to contain granular material and each being provided with bottom outlet structure through which such material is discharged, each of said bottom outlet structures having a gravity discharge opening in the lower portion thereof equipped with a closure to prevent unloading of such material by gravity action from the hopper body associated therewith when said gravity discharge opening is closed, a pair of pneumatic discharge conduits respectively connected at the inner ends thereof with the lower portions of said bottom outlet structures in communication with the interiors thereof and each of said pneumatic discharge conduits having at its outer end a suction connection to facilitate pneumatic unloading of such material from the hopper bodies respectively associated therewith, a pair of valve elements respectively arranged in the upper portions of said bottom outlet structures and selectively movable relative to the respective bottom outlet structures between closed and open positions so that such material in said hopper bodies may be selectively unloaded therefrom through the corresponding bottom outlet structures by either gravity action or pneumatic action when the corresponding valve elements are open but cannot be unloaded from the respective hopper bodies through the respective bottom outlet structures by either gravity action or pneumatic action when the corresponding valve elements are closed, a pair of mechanisms for respectively moving said valve elements selectively between their closed and open positions, and a connector conduit arranged at the opposite ends thereof with the respective discharge outlet structures in communication with the interiors thereof, whereby both of said hopper bodies can be unloaded by pneumatic action through either of said pneumatic discharge conduits.

2. The combination of claim 1, in which said valve elements are also respectively arranged in the lower portions of said hopper bodies in cooperating relation with the respectively associated bottom outlet structures.

3. The combination of claim 1, in which each of said valve elements comprises a pair of upwardly extending gates selectively movable between a lower closed position and an upper open position.

4. The combination of claim 1, and further comprising a pair of hoods respectively supported in said hopper bodies in generally covering relation with the respectively associated bottom outlet structures, and in which the respective valve elements are selectively movable between a lower fully closed position and an upper fully open position in substantial adjacency with the respectively associated hoods.

5. In combination, a hopper body adapted to contain granular material and being provided with structure defining a bottom outlet through which such material is discharged from said hopper body, an upwardly extending hood supported in the lower portion of said hopper body in generally covering relation with said bottom outlet and providing a pair of elongated depending wall members having a pair of ports in the lower portions thereof communicating with said hopper body, a pair of gates arranged in said hood and selectively movable therein between lower closed positions with respect to said ports preventing material in said hopper body from being unloaded therefrom via said ports through said bottom outlet and upper open positions with respect to said ports permitting material in said hopper body to be unloaded therefrom via said ports through said bottom outlet, and mechanism for selectively moving said gates between their lower and upper positions, wherein said wall members are oriented in facing relation and diverge downwardly and laterally, and wherein said gates are oriented in corresponding facing relation and diverge downwardly and laterally in respective adjacency with said wall members and in cooperating relation with said ports.

6. In combination, a hopper body adapted to contain granular material and being provided with structure defining a bottom outlet through which such material is discharged from said hopper body, an elongated hood supported in the lower portion of said hopper body in generally covering relation with said bottom outlet and being provided with upwardly extending wall members converging adjacent the upper ends thereof and providing ports in the lower portions thereof communicating with said hopper body, an elongated valve element arranged in said hood and including upwardly extending gates converging adjacent the upper ends thereof and cooperating with said ports, said valve element being movable in said hood between upper and lower positions causing movements of said gates into respective open and closed positions with respect to said ports, said gates in their closed positions preventing material in said hopper body from being unloaded therefrom through said ports and said bottom outlet and said gates in their open positions permitting material in said hopper body to be unloaded therefrom through said ports and said bottom outlet, and mechanism for selectively moving said valve element between its upper and lower positions.

7. In combination, a hopper body adapted to contain granular material and being provided with structure defining a bottom outlet through which such material is discharged from said hopper body, a pair of forwardly extending elongated gates arranged in said hopper body and selectively movable with respect to said bottom outlet between a lower closed position and an upper open position, said gates being supported adjacent the upper ends thereof for lateral displacement during movement thereof between said lower and upper positions, guide structure for guiding said gates during movement thereof and for controlling such lateral displacement, and mechanism for selectively moving said gates between the lower and upper positions thereof, wherein said gates are oriented in facing relation and are pivotally connected together adjacent to the upper ends thereof.

8. In combination, a hopper body adapted to contain granular material and being provided with structure defining a bottom outlet through which such material is discharged from said hopper body, a valve element arranged in said hopper body and including a pair of elongated gates oriented in facing relation and supported adjacent the upper ends thereof and normally diverging downwardly and laterally therefrom and being selectively movable with respect to said bottom outlet between a lower closed position and an upper open position, guide structure interposed between said gates for engagement with the respective inner surfaces thereof for limiting displacement of said gates toward each other during movements thereof between the closed and open positions thereof, and mechanism for selectively moving said valve element between its lower and upper positions.

9. The combination of claim 8, in which said guide structure comprises a plurality of horizontally spaced-apart wheels having circumferential surface portions thereof in engagement with said gates.

10. The combination of claim 8, in which said mechanism comprises a rack fixedly carried by one of said gates along the inner surface thereof and a rotatably mounted pinion in engagement with said rack.

11. Hopper bottom structure comprising a pair of opposed downwardly and inwardly inclined side walls and a pair of opposed downwardly and inwardly inclined end walls cooperating to define a hollow inverted frusto-pyramid having an open top and a bottom outlet, said end walls having a pair of aligned end openings respectively provided therein, a pair of opposed hood-like members respectively arranged in said end openings and respectively secured in place upon said end walls, each of said members including an inner end disposed within said frusto-pyramid and an outer end arranged exteriorly of said frusto-pyramid, the inner ends of said members terminating adjacent to the opposite ends of said bottom outlet, a pair of opposed end plates respectively arranged in the inner ends of said members and closing the same to the exterior, and a valve element arranged between said end plates and cooperating with said bottom outlet and movable between closed and open positions with respect to said bottom outlet.

12. The hopper bottom structure set forth in claim 11, wherein said pair of side walls and said pair of end walls are fabricated from a pair of complementary and substantially identical sections, each of said sections being integral and including one of said side walls and substantially one-half of each of said end walls, the assembly of said sections into cooperating relation defining said pair of end openings in said end walls, and said sections being secured in assembled cooperating relation by two welded seams respectively disposed in said end walls.

13. In combination, a pair of hopper bodies each adapted to contain granular material, a pair of bottom outlet structures respectively carried by the lower portions of said hopper bodies and respectively communicating with the interiors thereof and through which such material is respectively discharged from said hopper bodies, a pair of pneumatic discharge conduits respectively connected at the inner ends thereof to the lower portions of said bottom outlet structures and respectively communicating with the interiors thereof and respectively accommodating pneumatic unloading therethrough of such material from the respectively connected ones of said bottom outlet structures, a pair of valve elements respectively arranged at the upper portions of said bottom outlet structures, each one of said valve elements being selectively movable relative to the associated one of said bottom outlet structures between closed and open positions, so that such material in the associated one hopper body may be selectively unloaded therefrom through said one bottom outlet structure only when said one valve element occupies its open position, a pair of mechanisms respectively arranged with said valve elements for selectively moving the same between their closed and open positions, a connector conduit respectively connected at the opposite ends thereof to said bottom outlet structures and respectively communicating with the interiors thereof and accommodating pneumatic unloading therethrough of such material from either connected one of said bottom outlet structures, each of said discharge conduits also accommodating pneumatic unloading therethrough of such material from said connector conduit, said discharge conduits being respectively equipped at the outer ends thereof with suction connections accommodating pneumatic unloading therethrough of such materials from the respectively adjacent ones of said discharge conduits, and a blanking tube independent of said valve elements and selectively insertable from the outside longitudinally into either one of said discharge conduits and through the one of said bottom outlet structures connected thereto and into communication with the adjacent end of said connector conduit, said blanking tube in its inserted position in one of said discharge conduits isolating the connected one of said bottom outlet structures from said one discharge conduit; whereby only the other of said bottom outlet structures is effectively connected via said connector conduit and said blanking tube to said one discharge conduit.

14. The combination set forth in claim 13, wherein said pneumatic discharge conduits are also respectively equipped at the outer ends thereof with removable closure caps, each one of said closure caps being adapted to cooperate with the associated one of said pneumatic discharge conduits to define an air intake selectively adjustable from fully closed position into fully open position, so as to control the flow of air into said one pneumatic discharge conduit when the other of said pneumatic discharge conduits is connected with a suction line for unloading such material by pneumatic action therethrough.

15. In a hopper body adapted to contain granular material and including structure carried by the lower portion of said hopper body and defining a bottom outlet through which such material is discharged from said hopper body; the combination comprising an upstanding hood supported within the lower portion of said hopper body and positioned above said bottom outlet and arranged in generally covering relation therewith, said hood having a port in the lower portion thereof communicating between said bottom outlet and the interior of said hopper body, a valve element positioned above said bottom outlet and arranged within said hood, said valve element being selectively movable between open and closed positions with respect to said port, and mechanism for selectively moving said valve element between its open and closed positions.

16. In a hopper body adapted to contain granular material and including structure carried by the lower portion of said hopper body and defining a bottom outlet through which such material is discharged from said hopper body; the combination comprising an upstanding hood supported within the lower portion of said hopper body and positioned above said bottom outlet and arranged in generally covering relation with said bottom outlet, said hood including a pair of elongated depending wall members having a pair of ports respectively arranged in the lower portions thereof, each of said ports communicating between said bottom outlet and the interior of said hopper body, a pair of gates positioned above said bottom outlet and arranged within said hood and respectively cooperating with said ports, each one of said gates being selectively movable in said hood between a lower closed position with respect to the associated one of said ports preventing material in said hopper body from being unloaded therefrom via one port through said bottom outlet and an upper open position with respect to the associated one of said ports permitting material in said hopper body to be unloaded therefrom via said one port through said bottom outlet, and mechanism for selectively moving said gates between their lower and upper positions.

17. The combination set forth in claim 16, and further comprising guide structure arranged within said hood and cooperating with said gates for guiding the movements thereof between their lower and upper positions.

18. The combination set forth in claim 17, wherein said guide structure is arranged between said gates for engagement with the respective inner surfaces thereof.

19. The combination set forth in claim 18, wherein said guide structure includes a plurality of wheels having circumferential surface portions in respective engagements with the inner surfaces of said gates.

20. The combination set forth in claim 15, wherein said mechanism essentially comprises a rack carried by said valve element, a pinion engaging said rack, and means for rotating said pinion so as selectively to move said valve element between its open and closed positions.

21. In a hopper body adapted to contain granular material and including structure carried by the lower portion of said hopper body and defining a bottom outlet through which such material is discharged from said hopper body; the combination comprising a pair of downwardly extending elongated gates supported within the lower portion of said hopper body and positioned above said bottom outlet and cooperating therewith, said gates being selectively movable with respect to said bottom outlet between lower closed positions and upper open positions, said gates being oriented in facing relation and pivotally connected together, whereby said gates are simultaneously movable between their lower and upper positions, means for guiding the movements of said gates between their lower and upper positions, and mechanism for selectively moving said gates simultaneously between their lower and upper positions.

22. In a hopper body adapted to contain granular material and including structure carried by the lower portion of said hopper body and defining a bottom outlet through which such material is discharged from said hopper body; the combination comprising a pair of downwardly extending elongated gates supported within the lower portion of said hopper body and positioned above said bottom outlet and cooperating therewith, said gates being selectively movable with respect to said bottom outlet between lower closed positions and upper open positions, said gates being oriented in facing relation and pivotally connected together adjacent the upper ends thereof for lateral displacement during movements thereof between their lower and upper positions, guide structure guiding said gates during the movements thereof and for effecting said lateral displacement thereof, and mechanism for selectively moving said gates between their lower and upper positions.

23. In a hopper body adapted to contain granular material and including structure carried by the lower portion of said hopper body and defining a bottom outlet through which such material is discharged from said hopper body; the combination comprising a pair of downwardly extending elongated gates supported within the lower portion of said hopper body and positioned above said bottom outlet and cooperating therewith, said gates being selectively movable with respect to said bottom outlet between lower closed positions and upper open positions, said gates being oriented in facing relation and pivotally connected together, whereby said gates are simultaneously movable between their lower and upper positions, guide structure for guiding the movements of said gates between their lower and upper positions, mechanism for selectively moving said gates simultaneously between their lower and upper positions, and cam means respectively cooperating with said gates and said structure for automatically urging said gates into their fully closed positions with respect to said bottom outlet as said gates are moved into their lower positions.

24. The combination set forth in claim 23, wherein said cam means comprise cam members respectively carried by said gates and pins carried by said structure, said pins engaging said cams as said gates are moved into their lower positions.

25. In combination, a pair of hopper bodies arranged in side-by-side relation and each adapted to contain granular material, a pair of bottom outlet structures respectively carried by the lower portions of said hopper bodies and respectively communicating with the interiors thereof and through which such material is respectively discharged from said hopper bodies, a pair of pneumatic discharge conduits respectively connected at the inner ends thereof to the lower portions of said bottom outlet structures and respectively communicating with the interiors thereof and respectively accommodating pneumatic unloading therethrough of such material from the respectively connected ones of said bottom outlet structures, a connector conduit respectively connected at the opposite ends thereof to said bottom outlet structures and respectively communicating with the interiors thereof and accommodating pneumatic unloading therethrough of such material from either connected one of said bottom outlet structures, each of said discharge conduits also accommodating pneumatic unloading therethrough of such material from said connector conduit, said discharge conduits being respectively equipped at the outer ends thereof with suction connections accommodating pneumatic unloading therethrough of such material from the respectively adjacent ones of said discharge conduits, and a blanking tube arranged to be selectively inserted and removed from the outside longitudinally with respect to either one of said pneumatic discharge conduits, said blanking tube in its inserted position in one of said pneumatic conduits communicating with the adjacent one end of said connector conduit and isolating the connected one of said bottom outlet structures from said one pneumatic discharge conduit, whereby only the other of said bottom outlet structures is effectively connected via said connector conduit and said blanking tube to said one pneumatic discharge conduit.

26. The combination set forth in claim 25, wherein said pair of pneumatic discharge conduits are also respectively equipped at the outer ends thereof with a pair of removable closure caps, each one of said closure caps being adapted to cooperate with the associated one of said pneumatic discharge conduits to define an air intake selectively adjustable from fully closed position into fully open position, so as to control the flow of air into said one pneumatic discharge conduit when the other of said pneumatic discharge conduits is connected with a suction line for unloading such material by pneumatic action therethrough.

References Cited in the file of this patent

UNITED STATES PATENTS

| | | |
|---|---|---|
| 2,190,727 | McKenna | Feb. 20, 1940 |
| 2,393,932 | Petroe | Jan. 29, 1946 |
| 2,502,741 | Norbom | Apr. 4, 1950 |
| 2,650,726 | Aller | Sept. 1, 1953 |
| 2,745,563 | Dath | May 15, 1956 |
| 2,844,411 | Aller | July 22, 1958 |
| 2,915,338 | Loomis | Dec. 1, 1959 |
| 2,926,963 | Dorey | Mar. 1, 1960 |
| 2,962,325 | Dorey | Nov. 29, 1960 |